США011366673B1

(12) United States Patent
Schoeller et al.

(10) Patent No.: US 11,366,673 B1
(45) Date of Patent: Jun. 21, 2022

(54) MANAGING TRANSITIONING OF COMPUTING SYSTEM TO POWER-ON STATE FROM STANDBY-POWER STATE

(71) Applicant: Hewlett Packard Enterprise Development LP, Houston, TX (US)

(72) Inventors: Patrick Schoeller, Cypress, TX (US); David Heinrich, Tomball, TX (US); Scott Faasse, Tomball, TX (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 17/183,751

(22) Filed: Feb. 24, 2021

(51) Int. Cl.
| | |
|---|---|
| *G06F 9/44* | (2018.01) |
| *G06F 1/32* | (2019.01) |
| *G06F 9/4401* | (2018.01) |
| *G06F 1/3296* | (2019.01) |
| *G06F 1/3287* | (2019.01) |

(52) U.S. Cl.
CPC .......... *G06F 9/4418* (2013.01); *G06F 1/3287* (2013.01); *G06F 1/3296* (2013.01)

(58) Field of Classification Search
CPC ..... G06F 9/4418; G06F 1/3287; G06F 1/3296
See application file for complete search history.

(56) References Cited

U.S. PATENT DOCUMENTS

| 8,185,728 B2 | 5/2012 | Lee et al. |
| 9,442,546 B2 | 9/2016 | Han |
| 10,128,831 B1 | 11/2018 | Lam et al. |
| 2005/0132092 A1* | 6/2005 | Mylly ................... G06F 9/4411 710/8 |
| 2014/0365690 A1* | 12/2014 | Paramasivam ....... G06F 13/385 710/8 |
| 2015/0234723 A1* | 8/2015 | Chuang ............... G06F 11/2247 713/2 |

FOREIGN PATENT DOCUMENTS

CN         104375915        2/2015

OTHER PUBLICATIONS

Network Card Initialization Delayed on Start causes down stream services to fail, (Web Page), Sep. 9, 2016, 2 Pgs.
Running Services After the Network is up, (Web Page), Oct. 12, 2018, 4 Pgs.

* cited by examiner

*Primary Examiner* — Stefan Stoynov
(74) *Attorney, Agent, or Firm* — Hewlett Packard Enterprise Patent Department

(57) ABSTRACT

Example implementations relate to system and method of managing transitioning of a computing system to a power-on state from a standby-power state. The computing system includes a manageability controller, an initialization controller, an auxiliary device, and a processor. In such examples, the manageability controller may first determine an initialization status of the auxiliary device from a data corresponding to the auxiliary device, when the computing system is transitioning from the standby-power state to the power-on state. In one or more examples, the initialization status may include the auxiliary device in an initialized stage or a non-initialized stage. Later, the manageability controller may direct the initialization controller to delay the transitioning of the computing system from the standby-power state to the power-on state, in response to determining that the initialization status of the auxiliary device is in the non-initialized stage.

20 Claims, 4 Drawing Sheets

MANAGING TRANSITIONING OF COMPUTING SYSTEM TO POWER-ON STATE FROM STANDBY-POWER STATE

BACKGROUND

In general, a computing system, for example, a server has two power states, such as a standby-power state and a power-on state. In the standby-power state, a low voltage/amperage device, for example, a manageability controller or an electrically erasable programmable read only memory (EEPROM) of the computing system are operational to provide a basic services about the computing system to user. For example, the manageability controller may interact with one or more auxiliary devices/adapters of the computing system to obtain a) management information and b) health metrics information from those auxiliary devices and communicate that information to the user. Further, in the standby-power state, high voltage/amperage devices, for example, a processor and/or a chipset of the computing system are not operational, along with high speed/bandwidth physical transport interfaces, such as peripheral component interconnect express (PCIe), or the like.

BRIEF DESCRIPTION OF THE DRAWINGS

Various examples will be described below with reference to the following figures.

Figure 1:
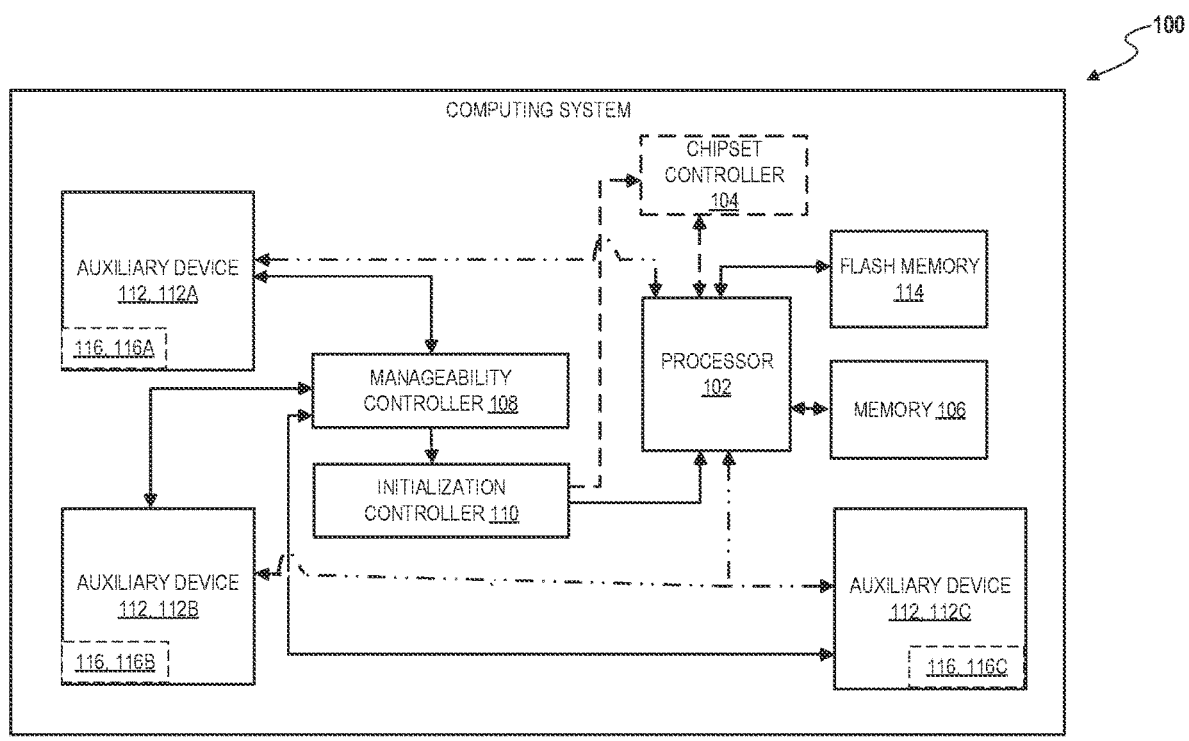
FIG. 1 is a block diagram depicting a computing system having a manageability controller, a plurality of auxiliary devices, an initialization controller, and a processor, in accordance with embodiments of the present disclosure.

Throughout the drawings, identical reference numbers may designate similar, but not necessarily identical, elements. An index number "N" appended to some of the reference numerals may be understood to merely denote plurality and may not necessarily represent the same quantity for each reference numeral having such an index number "N". Additionally, use herein of a reference numeral without an index number, where such reference numeral is referred to elsewhere with an index number, may be a general reference to the corresponding plural elements, collectively or individually. In another example, an index number of "I," "M," etc. can be used in place of index number N. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

The following detailed description refers to the accompanying drawings. Wherever possible, the same reference numbers are used in the drawings and the following description to refer to the same or similar parts. It is to be expressly understood, however, that the drawings are for the purpose of illustration and description only. While several examples are described in this document, modifications, adaptations, and other implementations are possible. Accordingly, the following detailed description does not limit the disclosed examples. Instead, the proper scope of the disclosed examples may be defined by the appended claims.

The terminology used herein is for the purpose of describing examples only and is not intended to be limiting. As used herein, the singular forms "a," "an," and "the" are intended to include the plural forms as well, unless the context clearly indicates otherwise. The term "plurality," as used herein, is defined as two, or more than two. The term "another," as used herein, is defined as at least a second or more. The term "coupled," as used herein, is defined as connected, whether directly without any intervening elements or indirectly with at least one intervening elements, unless otherwise indicated. Two elements may be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, third, etc. may be used herein to describe various elements, these elements should not be limited by these terms, as these terms are only used to distinguish one element from another unless stated otherwise or the context indicates otherwise. As used herein, the term "includes" means includes but not limited to, the term "including" means including but not limited to. The term "based on" means based at least in part on.

As used herein, the term "auxiliary device" or "auxiliary adaptor" may refer to a type of an electronic component, which is not native to a computing system, or which is ancillary to the computing system and may have to be added by way of plugging/mounting to the computing system, to put information into and get information out of the computing system. As used herein, the term "initialized stage" may refer to a condition of the auxiliary device, which is ready to be discovered (i.e., after the auxiliary device has successfully completed self-booting steps) by the computing system for performing transactions with the computing system and/or intended functions. Similarly, the term "non-initialized stage" may refer to a condition of the auxiliary device, which is yet to be discovered (i.e., the auxiliary device is yet to successfully complete the self-booting steps) by the computing system for performing transactions with the computing system and/or intended functions. As used herein the term "standby-power state" may refer to a power saving mode of the computing system, where one or more core components (e.g., processor, memory, or the like) and one or more auxiliary devices (e.g., smart NIC, camera device, a human interface device, or the like) of the computing system are in an idle mode or in a reset mode. Similarly, the term "power-on" state may refer to an active power supply mode of the computing system, where the one or more core components and the one or more auxiliary devices of the computing system are in the working mode or released from the reset mode.

For purposes of explanation the present disclosure, certain examples are described with reference to the components illustrated in FIGS. 1-5. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples. Further, the sequence of operations described in connection with FIGS. 2 and 5 is an example and is not intended to be limiting. Additional or fewer operations or combinations of operations may be used or may vary without departing from the scope of the disclosed examples. Thus, the present disclosure merely sets forth examples of implementations, and many variations and modifications may be made to the described examples. Such modifications and variations are intended to be included within the scope of this disclosure and protected by the following claims.

The present disclosure describes example implementations of a system and a method of managing transitioning of a computing system from a standby-power state to a power-on state. In particular, the present disclosure teaches determining an initialization status of an auxiliary device or auxiliary adapter connected to the computing system, when the computing system is transitioning to the power-on state from the standby-power state, and delaying the transitioning of the computing system to the power-on state in response to determining that the auxiliary device is in a non-initialized stage. In some examples, the auxiliary device may be a smart device, such as a smart network interface card (smart NIC) connected to an auxiliary port, for example, a peripheral component interconnect express (PCIe) port of the computing system.

Computer systems, such as a server, a storage system, a power conversion system, a networking system, communication system, or the like, are designed to work with a wide variety of auxiliary devices. In general, most of the auxiliary devices, for example, human interface devices or storage devices are included in the computing system, when the computing system is originally manufactured. However, some particular types of the auxiliary devices, for example, smart devices may be added to the computing system by the user to expand the capabilities of the computing system. Generally, the smart devices, such as a smart network interface card (smart NIC), a smart graphics interface card, or the like, are built on emerging technology to allow them to function as an autonomous computing machineries. Because, such smart devices generally include a microprocessor or some other programmable electronic component to enable them to operate intelligently and/or perform transactions with the computing system.

Further, the processor of the computing system may need to be cognizant of the smart devices that are added to the computing system to provide them with the necessary power and transport interfaces, such as a peripheral component interconnect express (PCIe), an inter-integrated circuit (I2C), or the like, to enable such smart devices to perform their intended functions and/or transactions with the computing system. Accordingly, the smart devices have to be initialized first, in order to allow them to be discovered by the processor of the computing system to provide those smart devices with necessary power and transport interfaces.

However, when the computing system is transitioning from the standby-power state to the power-on state, certain types of the smart devices, for example, the smart NIC may require a substantially longer time period to initialize than what is currently supported by an existing industry standard specifications to initialize the processor and/or the transport interfaces. In such scenarios, the smart devices, which requires substantially longer time period for initialization may not get initialized, because a manageability controller of the computing system may immediately re-initiate power supply to the processor and/or release the processor from the reset mode, as per the existing industry standard specifications to transition the computing system to the power-on mode.

To address such issues, the existing industry standard specifications for initializing the processor and/or the transport interfaces may have be changed/amended. However, such a process of changing the industry standard specifications may be cumbersome and time consuming task. Accordingly, one of the goal of the computing system having the smart devices, is to provide an intermittent time period for the smart devices to initialize before transitioning the computing system to the power-on state, i.e., by re-initiating the power supply to the processor and/or releasing the processor from the reset mode.

A viable technical solution to the aforementioned problems may include providing a manageability controller and an initialization controller for managing transitioning of a computing system from a standby-power state to a power-on state. In some examples, the manageability controller may first determine an initialization status of one or more auxiliary devices, when the computing system is transitioning to the power-on state. Later, if the manageability controller determines that the one or more auxiliary devices requires substantially more time than an industry standard specifications for transitioning the computing system to the power-on state, then the manageability controller may instruct the initialization controller to delay the transitioning of the computing system to the power-on state. Thereby, holding the computing system in the standby-power state. In some examples, the initialization controller may i) maintain a power supply to at least one of a processor or a chipset of the computing system in a suspended mode and/or ii) maintain the at least one of the processor or the chipset in a reset mode, in order to delay the transitioning of the computing system from the standby-power state to the power-on state. Thus, the manageability controller and the initialization controller may provide sufficient time period for the one or more auxiliary devices to get initialized, before re-initiating the power supply to the at least one of the processor or the chipset of the computing system and/or releasing the at least one of the processor or the chipset from the reset mode, in order to transition the computing system to the power-on state.

In one or more examples, the manageability controller and the initialization controller may receive power from an auxiliary power rail, even when the computing system is in the standby-power state or a switched-off state. Therefore, the manageability controller and the initialization controller are in active power supply state (e.g., working mode) even when the computing system is in the standby-power state, thereby allowing the manageability controller to obtain a) management information, b) health metrics information, and c) initialization status from the one or more auxiliary devices. Accordingly, the manageability controller may communicate the a) management information and b) health metrics information to the administrator, and/or c) manage the transitioning of computing system to the power-on state from the standby-power state. A manageability controller of the computing system may be on a separate chip from a processor (a main or host processor) of the computing system. The manageability controller is also on a separate chip from the smart device. Similarly, an initialization controller may be implemented on a separate chip.

In some examples, after the computing system is transitioned to the power-on state, the processor may retrieve a basic input/output system (BIOS) from a flash memory to a non-volatile memory of the computing system, and execute the BIOS to perform a power on system test (POST) on the one or more auxiliary devices. After, the BIOS is executed, the processor may further execute an industry standard unified extensible firmware interface (UEFI), so as to allow the UEFI to initialize various other devices/components of the computing system, such as transport interfaces, or the like. Thus, the manageability controller and the initialization controller may allow the auxiliary devices to get ready and discovered by the processor to perform the intended functions and transactions with the computing system.

Accordingly, example implementations of the present disclosure teaches a system and a method for managing transitioning of a computing system to the power-on state from the standby-power state. In such examples, the computing system includes the manageability controller, the initialization controller, the auxiliary device, and the processor. The manageability controller may first determine an initialization status of the auxiliary device from a data corresponding to the auxiliary device, when the computing system is transitioning from the standby-power state to the power-on state. In one or more examples, the initialization status may include the auxiliary device in an initialized stage or a non-initialized stage. Later, the manageability controller may direct the initialization controller to delay the transitioning of the computing system from the standby-power state to the power-on state, in response to determining that the initialization status of the auxiliary device is in the non-initialized stage.

Figure 2:
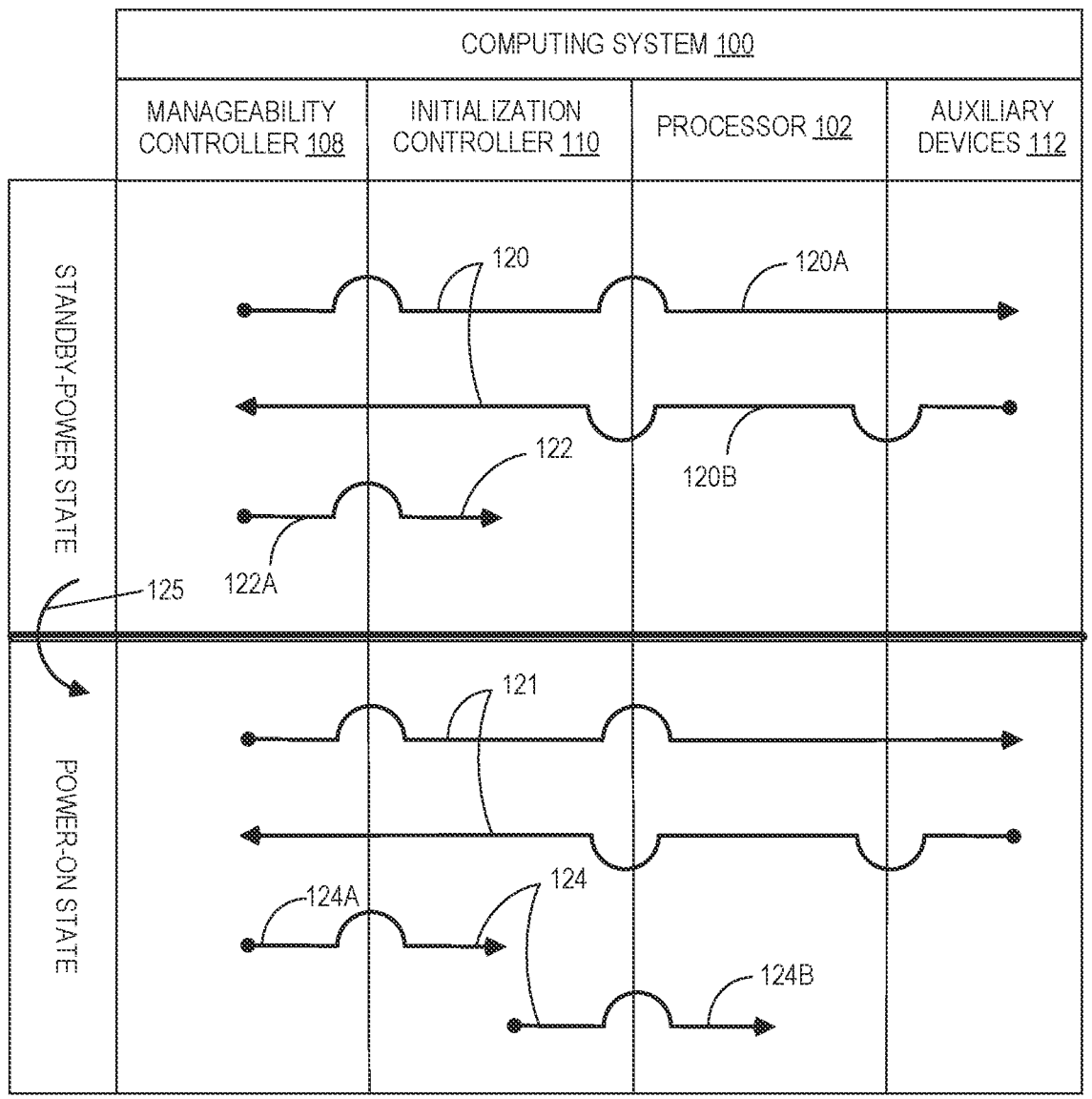
FIG. 2 is a block diagram depicting a process of transitioning the computing system of FIG. 1 to a power-on state from a standby-power state, in accordance with embodiments of the present disclosure.

FIG. 1 illustrates an example computing system 100, which may be deployed in a data center environment to provide services to one or more customers. FIG. 2 is a block diagram depicting a process of transitioning the computing system 100 of FIG. 1 to a power-on state from a standby-power state. In some examples, the computing system 100 is a server, which may contain sensitive data, which may be connected to a TCP/IP network, including the internet, and which may host or execute one or more workloads. In some other examples, the computing system 100 may be a storage system, a power conversion system, a networking system, communication system, or the like without deviating from the scope of the present disclosure. In some examples, the computing system 100 includes a processor 102, a chipset 104, a memory 106, a manageability controller 108, an initialization controller 110, and a plurality of auxiliary devices 112.

The processor 102 may be a physical processor, such as a central processing unit (CPU). In some other examples, the processor 102 may be a graphics processing unit (GPU), a microprocessor, or the like. In some examples, the processor 102 may be operably coupled to the chipset 104, the memory 106, the initialization controller 110, the plurality of auxiliary devices 112, and the flash memory 114. The chipset 104 may be a collection of integrated circuits (IC) to perform a particular task in the computing system 100. For example, the chipset 104 may control communication between the processor 102, the memory 106, and the plurality of auxiliary devices 112. The memory 106 may be a volatile memory, for example, a random access memory, a cache memory, or the like, and/or a non-volatile memory, for example, an electrically erasable programmable read-only memory or a hard-disk, or the like.

The manageability controller 108 may be a specialized service processor, which may be capable of monitoring a physical state of the computing system 100 and/or controlling hardware resources, such as the processor 102, the chipset 104, the memory 106, the plurality of auxiliary devices 112, or the like. In some examples, the manageability controller 108 is a baseboard management controller (BMC) embedded within a circuit board (e.g., motherboard) of the computing system 100 to be monitored. In such examples, the circuit board may also host the processor 102. Further, the manageability controller 108 may have its own memory (e.g., machine readable machine) and a processing resource coupled to the memory, and may execute one or more program instructions stored in the memory to monitor the computing system 100, and regulate transitioning of the hardware resources of the computing system 100 to a power-on state. The manageability controller 108 may be powered by an auxiliary power rail (not shown), even when the computing system 100 is in a standby-power state, thereby allowing the manageability controller 108 to orchestrate transition sequence of the computing system 100 from a standby-power state to the power-on state.

The initialization controller 110 may be a digital logic circuit device, for example, a field-programmable gate array (FPGA) device or a complex programmable logic (CPLD) device, or the like. The initialization controller may make logical decisions based on inputs/instructions from the manageability controller 108. In some examples, the initialization controller 110 is operably coupled to the manageability controller 108, the processor 102, and the chipset 104. In such examples, the initialization controller 110 may control signals to the processor 102 and/or the chipset 104, based on the instruction from the manageability controller 108. For example, the initialization controller may generally have some default functions to perform, such as directing signals to re-initiate the power supply to the processor 102 and/or the chipset 104, and/or releasing the processor 102 from the reset mode, or the like, when the computing system 100 is transitioning to the power-on state from the standby-power state. However, such default functions of the initialization controller 110 may be modified/controlled through instructions from the manageability controller 108. In one or more examples, the manageability controller 108 and the initialization controller 110 may use an industry standard messaging protocol to interact with one another, such as a platform management communications infrastructure (PMCI) or inter-integrated circuit (I2C) protocol, for example.

Each of the plurality of auxiliary devices 112 may be an electronic equipment, which may be included in the computing system 100 when it is originally manufactured, or may have been added later to the computing system 100 for enhancing the capability of the computing system 100. For example, the plurality of auxiliary devices 112 may be connected to the circuit board of the computing system 100. In the example of FIG. 1, the plurality of auxiliary devices 112 may include a universal serial bus (USB) hub 112A, and a graphics card 112B, and a smart network interface card (smart NIC) 112C, for example. As discussed, hereinabove the smart NIC 112C may be added to the computing system 100 to enhance the network capability of the computing system 100. The smart NIC 112C may be a hardware component used to connect the computing system 100 to the data center management system over an Ethernet network (not shown). In one or more examples, the smart NIC 112C may offload certain network functions of the processor 102, thus freeing the processor 102 to enhance the performance of the computing system 100 to handle the one or more workloads. For example, the smart NIC 112C may employ one or more specialized processors to offload the functions, for example, low-level functions from the processor 102. Further, each of the plurality of auxiliary devices 112 may support industry messaging protocols to allow interoperability between the manageability controller 108 and the processor 102. In some examples, the industry standard messaging protocols may include a peripheral component interconnect express (PCIe), platform management communications infrastructure (PMCI), inter-integrated circuit (I2C), system management bus (SMBus), or the like.

During start-up of the computing system 100 or after the computing system 100 is transitioned from a standby-power state to a power-on state, the processor 102 may load a basic input/output system (BIOS) from the flash memory 114 into the memory 106 and execute the BIOS from the memory 106 in order to perform a plurality of start-up steps. In some examples, the plurality of start-up steps may include i) discovering the plurality of auxiliary devices 112 of the computing system 100, ii) performing a power on system test (POST) on the plurality of auxiliary devices 112, iii) executing a unified extensible firmware interface (UEFI) to initialize various other components of the computing system, such as transport interfaces, or the like, and iv) loading the OS into the memory 106. In other words, when the BIOS is executed, it may first discover the auxiliary devices 112 those are successfully initialized, and later perform the POST on the discovered auxiliary devices 112 and initialize the transport interfaces. Once, the OS is loaded into the memory 106, the processor 102 may boot the OS from the memory 106. Subsequently, the OS may perform all basic tasks like file management, memory management, process management, handling input and output, and controlling the auxiliary devices 112, and the like.

In some examples, when the computing system 100 is in the power-on state, the user may switch the computing system 100 to the standby-power state by issuing soft or hard commands to the computing system 100. Further, the user may switch the computing system 100 back to the power-on state from the standby-power state by re-issuing the soft or hard commands. As noted hereinabove, the standby-power state, for example, a sleep state or a hibernate state may refer to a condition of the computing system 100, where the core components/devices, for example, the processor 102 of the computing system 100, and the plurality of auxiliary devices 112 of the computing system 100 are in an idle mode or a reset mode. Similarly, the power-on state may refer to the condition of the computing system 100, where the core components/devices and the plurality of auxiliary devices are in the working mode or released from the reset mode.

In some examples, the computing system 100 may get instruction(s) to transition from the standby-power state to the power-on state, by issuing the hard command, such as turning-on a power button of the computing system 100. In such examples, turning-on of the power button may result in generation of a transition signal. In one or more examples, the transition signal may function as a trigger to the plurality of auxiliary devices 112 to get themselves initialized. In such examples, at least some of the plurality of auxiliary devices 112 may have a chip or an integrated circuit (IC, not shown) to self-evaluate a time period required by the corresponding auxiliary device 112 for initialization.

Accordingly, the chip or the IC of the corresponding auxiliary device 112 may update a corresponding non-volatile memory of a plurality of non-volatile memory 116, with a data corresponding to the time period required by the corresponding auxiliary device 112 for initialization. In some examples, the USB hub 112A may update the non-volatile memory 116A with the time period data as "2" seconds, the graphics card 112B may update the non-volatile memory 116B with the time period data as "4" seconds, and the smart NIC 112C may update the non-volatile memory 116C with the time period data as "30" seconds. Further, the manageability controller 108, which is active in the standby-power state, may interrupt the transition signal, and orchestrate the transitioning of the computing system 100 to the power-on state. For example, once the manageability controller 108 interrupts the transition signal, it may first determine an initialization status of each of the plurality of auxiliary devices 112, as represented by reference numeral 120 in FIG. 2.

In one or more examples, the initialization status of each of the plurality of auxiliary devices 112 may represent whether the corresponding auxiliary device 112 is in an initialized stage or in a non-initialized stage. As noted hereinabove, the initialization of the auxiliary device 112 may refer to a condition of the auxiliary device 112, which has successfully completed self-booting steps, and is ready to be discovered by the processor 102 for performing transactions with the computing system 100 and/or its intended functions. Therefore, the auxiliary device 112 that has completed the initialization may have the initialization status as in the initialized stage. Further, the auxiliary device 112 that has not yet completed the initialization may have the initialization status as in the non-initialized stage. In some examples, depending on the initialization status of the plurality of auxiliary devices 112, the manageability controller 108 may direct the initialization controller 110 to either delay the transitioning of the computing system 100 to the power-on state or transition the computing system 100 to the power-on state, as represented by reference numeral 122, 124 respectively.

In one example, the manageability controller 108 may first determine the initialization status of the plurality of auxiliary devices 112 by accessing the non-volatile memory 116 of each of the plurality of auxiliary devices 112 to obtain the data that represents the time period required by the corresponding auxiliary device 112 for initialization, as represented by reference numeral 120A in FIG. 2. In one or more examples, the manageability controller 108 may utilize an industry standard communication protocol, for example, I2C to access the non-volatile memory 116 of each of the plurality of auxiliary devices 112. Accordingly, the manageability controller 108 may receive the data corresponding to the time period required from each of the plurality of auxiliary devices 112 for initialization, as represented by reference numeral 120B in FIG. 2. In such examples, the manageability controller 108 may process the received data from each of the plurality of non-volatile memory 116 to detect the time period required by each of the plurality of auxiliary devices 112 for initialization.

Accordingly, the manageability controller 108 may detect that the USB hub 112A requires "2" seconds, the graphics card 112B requires "4" seconds, and the smart NIC 112C requires "30" seconds for initialization. In such examples, the manageability controller 108 may further process the detected data to determine the initialization status of each of the plurality of auxiliary devices 112. For example, the manageability controller 108 may compare the detected data corresponding to the time period from each of the plurality of auxiliary devices 112 with an industry data corresponding to the industry standard specifications for transitioning the computing system 100 to the power-on state, in order to determine the initialization status. In some examples, the industry standard specifications for transitioning the computing system 100 to the power-on state may be set as "2" seconds. Thus, the manageability controller 108 may determine that the graphics card 112B and the smart NIC 112C may require substantially more time for initialization, and accordingly ascertain that the initialization status of one or more auxiliary devices 112 is in the non-initialized stage.

In one example, the manageability controller 108 may later direct the initialization controller 110 for delaying the transitioning of the computing system 100 to the power-on state, as represented by the reference numeral 122 in FIG. 2. In some examples, the manageability controller 108 may interact with the initialization controller 110 using the industry standard communication protocol, for example, I2C protocol. In such examples, the initialization controller 110 may delay the transitioning of the computing system 100 to the power-on state by re-establishing communication with power rails and/or signal rails corresponding to the processor 102 and/or the chipset 104. In some examples, the initialization controller 110 may delay the transitioning of the computing system 100 to the power-on state by maintaining the power supply to the processor 102 or the chipset 104 in a suspended mode. In some other examples, the initialization controller 110 may delay the transitioning of the computing system 100 to the power-on state by i) re-initiating the power supply to the processor 102 or the chipset 104, and ii) maintaining the processor 102 or the chipset 104 in a reset mode. In other words, the initialization controller 110 may act upon the instructions from the manageability controller 108, and configure the computing system 100 to delay the power transition to the processor 102 or hold the processor 102 in the reset state, so that no BIOS code is retrieved from the flash memory 114. Thus, effectively delaying the discovery of the auxiliary devices 112 and starting the POST. In one or more examples, the initialization controller 110 may control the power signal (rails) to the processor 102, and if the manageability controller 108 instructs a delayed initialization of the computing system 100, the initialization controller 110 may power on the circuit board including optional slots, but leave the processor 102 in i) a powered off or reset state or ii) powered on, but in the reset state.

In some examples, when the manageability controller 108 instructs the initialization controller 110 to delay the transitioning of the computing system 100, the manageability controller 108 may additionally provide the data corresponding to a maximum time period that is required by one of the plurality of auxiliary devices 112 for initialization, to the initialization controller 110. In such examples, the initialization controller 110 may suspend an onboard timer of the processor 102 for that maximum time period so as to hold the processor 102 or the chipset 104 in the reset mode and/or maintain the power supply to the processor 102 or the chipset 104 in the suspended mode. In some examples, the initialization controller 110 may hold the processor 102 in the reset mode for the time period of "30" seconds, which is the maximum time period required for initialization by the smart NIC 112C among the plurality of auxiliary devices 112.

In some examples, after the maximum time period required by one of the plurality of auxiliary devices 112 elapses, the initialization controller 110 may transition the computing system 100 to the power-on state, as represented by reference numeral 125, in FIG. 2. More particularly, the initialization controller may re-initiate the power supply to the processor 102 or the chipset 104, and/or the release/revoke the processor 102 or the chipset 104 to come out of the reset mode, as represented by reference numeral 124B in FIG. 2. Thus, allowing the processor 102 to begin the loading and executing of the BIOS to initiate the start-up sequences, as noted hereinabove. Alternatively, in some other examples, the manageability controller 108 may wait for the maximum time period required by one of the plurality of auxiliary devices 112 for initialization. Subsequently, the manageability controller 108 may initiate the transition of the computing system 100 from the standby-power state to the power-on state, as represented by reference numeral 125 in FIG. 2. For example, after the maximum time period required by one of the plurality of auxiliary devices 112 for transitioning has elapsed, the manageability controller 108 may direct the initialization controller 110 to transition the computing system 100 to the power-on state, as represented by reference numeral 124A in FIG. 2. Accordingly, the initialization controller 110 may re-initiate the power supply to the processor 102 or the chipset 104, and/or the release/revoke the processor 102 or the chipset 104 to come out of the reset mode, as represented by reference numeral 124B in FIG. 2.

In some other examples, the manageability controller 108 may determine the initialization status of the plurality of auxiliary devices 112 by querying each of the plurality of auxiliary devices 112 to obtain the data that represents an initialization counter of the corresponding auxiliary device 112, as represented by reference numeral 120A in FIG. 2. In some examples, the initialization counter may have the data in the form of bits, for example, "0" or "1", which may be representative of an "initialized stage" or a "non-initialized stage" respectively. In one or more examples, the manageability controller 108 may utilize an industry standard communication protocol, for example, PMCI to directly interact with the plurality of auxiliary devices 112. In some examples, the USB hub 112A may have the initialization counter as "0", the graphics card 112B may have the initialization counter as "1", and the smart NIC 112C may have the initialization counter as "1". Based on the query to the plurality of auxiliary devices 112, the manageability controller 108 may receive the data corresponding to the initialization counter from each of the plurality of auxiliary devices 112, as represented by reference numeral 120B in FIG. 2. In such examples, the manageability controller 108 may process the received data to determine the initialization status of each of the plurality of auxiliary devices 112. For example, the manageability controller 108 may compare the initialization counter data with a predetermined data to determine the initialization status of each of the plurality of auxiliary devices 112. In such examples, the predetermined data may also be in the form of bits, for example, "0" or "1", which may be representative of the "initialized stage" or the "non-initialized stage" respectively. In some examples, the graphics card 112B and the smart NIC 112C may be in the non-initialized stage based on comparison of the initialization counter data and the predetermined data.

In such examples, the manageability controller 108 may direct the initialization controller 110 for delaying the transitioning of the computing system 100 to the power-on state, as represented by the reference numeral 122 in FIG. 2.

Accordingly, the initialization controller 110 may delay the transitioning of the computing system 100 to the power-on state by re-establishing the communication with power rails and/or signal rails corresponding to the processor 102 and/or the chipset 104. In such examples, the manageability controller 108 may re-query the auxiliary devices 112, which are in the non-initialized stage, as represented by reference numeral 121 in FIG. 1 and ii) re-ascertain the initialization status of the auxiliary device, which are in the non-initialized stage, until an end of a pre-determined time period. In some examples, the pre-determined time period may be provided by the user for each of the plurality of auxiliary devices 112, and such pre-determined time period data may be stored in a machine readable medium of the manageability controller 108. In some examples, if the manageability controller 108 determines that all of the plurality of auxiliary devices 112 are in the initialized stage even before the pre-determined time period is elapsed, the manageability controller 108 may direct the initialization controller to transition the computing system 100 to the power-on state, as represented by reference numeral 124A in FIG. 2. In some other examples, when the manageability controller 108 determines that the pre-determined time period for initialization of the auxiliary device has been elapsed, it may direct the initialization controller 110 to transition the computing system 100 to the power-on state, as represented by reference numeral 124A in FIG. 2. Accordingly, the initialization controller 110 may re-initiate the power supply to the processor 102 or the chipset 104, and/or the release/revoke the processor 102 or the chipset 104 to come out of the reset mode, as represented by reference numeral 124B in FIG. 2.

In some other examples, the data may include a first data that represents the time period required by each of the plurality of auxiliary devices 112 for transitioning to the power-on state, and a second data that represents the initialization counter of each of the plurality of auxiliary devices 112. In such examples, the manageability controller 108 may first determine the initialization status of the plurality of auxiliary devices 112 by accessing the non-volatile memory 116 of the plurality of auxiliary devices 112 to obtain the first data, as represented by reference numeral 120 in FIG. 2.

As discussed hereinabove, the manageability controller 108 may then ascertain the initialization status of each of the plurality of auxiliary devices 112 by processing the first data. In one example, as discussed hereinabove, the manageability controller 108 may first detect that the USB hub 112A requires "2" seconds, the graphics card 112B requires "4" seconds, and the smart NIC 112C requires "30" seconds for initialization, based on processing of the first data. The manageability controller 108 may later determine that the graphics card 112B and the smart NIC 112C may require substantially more time for initialization based on comparison of detected data with the industry standard data. Accordingly, the manageability controller 108 may ascertain that the initialization status of one or more auxiliary devices 112 is in the non-initialized stage. Thus, in response to ascertaining the one or more auxiliary devices 112 is in the non-initialized stage, the manageability controller 108 may periodically query the one or more auxiliary devices 112, which are in the non-initialized stage to obtain the second data and ii) ascertain the initialization status of the auxiliary device by processing the second data, until an end of the time period represented in the first data. The time period represented in the first data may correspond to a maximum time period required by one of the plurality of auxiliary devices 112 for initialization. In some examples, the maximum time period may be related to the smart NIC 112C, which may be about "30" seconds. In some examples, if the manageability controller 108 determines that all of the plurality of auxiliary devices 112 are in the initialized stage i.e., even before the maximum time period is elapsed, the manageability controller 108 may direct the initialization controller to transition the computing system 100 to the power-on state, as represented by reference numeral 124A in FIG. 2. In some other examples, when the manageability controller 108 determines that the maximum time period for initialization of the auxiliary device 112 has been elapsed, it may direct the initialization controller 110 to transition the computing system 100 to the power-on state, as represented by reference numeral 124A in FIG. 2. Accordingly, the initialization controller 110 may re-initiate the power supply to the processor 102 or the chipset 104, and/or the release/revoke the processor 102 or the chipset 104 to come out of the reset mode, as represented by reference numeral 124B in FIG. 2.

Thus, the techniques discussed hereinabove may effectively stops time on the processor clock, thereby allowing the auxiliary devices 112 to initialize and become ready to interact with the BIOS configuration commands. In other words, the techniques discussed hereinabove provides a dynamic (or real-time configurable) time period to allow the smart devices, the sufficient time to initialize itself, while maintaining server compatibility with existing industry standard specifications. As discussed hereinabove, the industry standard transitioning of the computing system 100 (i.e., normal initialization sequence) is to immediately supply power to the processor 102 and take the processor 102 out of its reset mode, which in turn fetches the BIOS code from flash memory 114. The present disclosure provides techniques to retain the processor 102 in a standby-power mode or a reset mode, while allowing the other components, such as auxiliary devices or adapters to transition from the standby-power mode to power-on mode, and complete the initialization of the auxiliary devices or adapters, before permitting the processor 102 and/or the chipset 104 for transitioning to the power-on state to load and execute the BIOS.

Figure 3:
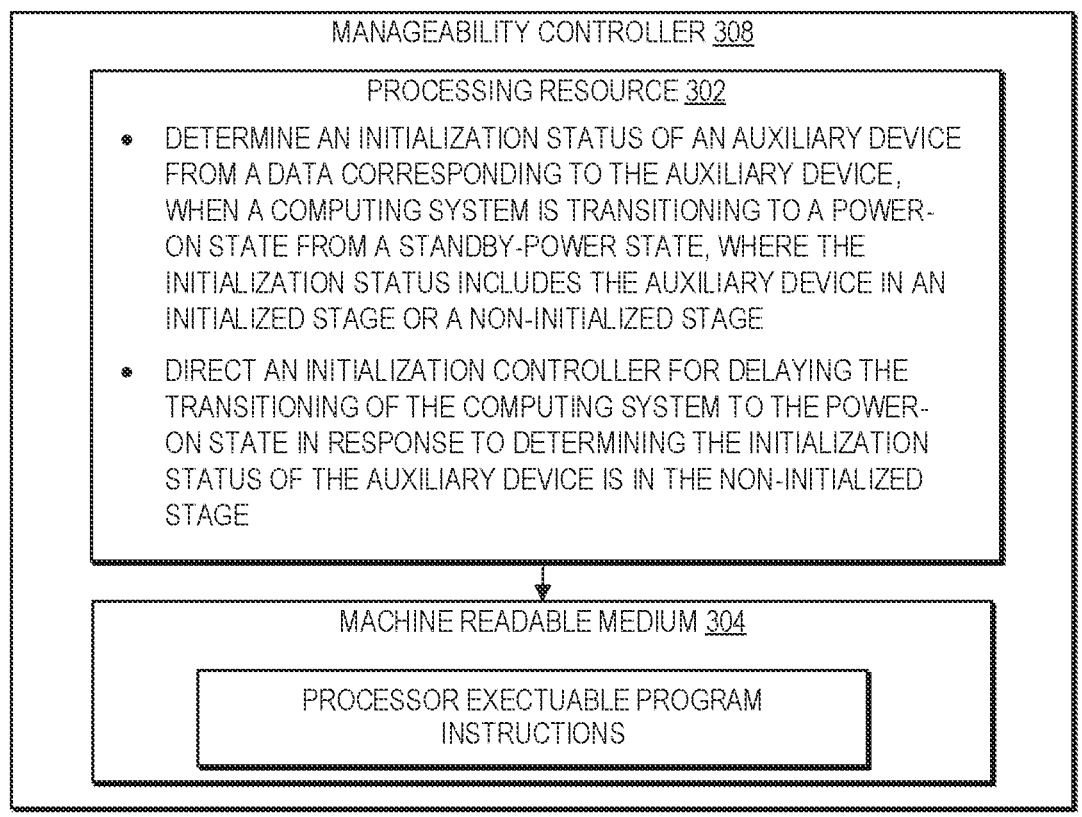
FIG. 3 is a block diagram depicting a manageability controller having a processing resource operably coupled to a machine readable medium storing executable program instructions, in accordance with embodiments of the present disclosure.

FIG. 3 is a block diagram of a manageability controller 308 including a processing resource 302 and a machine readable medium 304 storing executable program instructions. It should be noted herein that the manageability controller 308 referred to in FIG. 3 may be same or similar to manageability controller 108 described in FIGS. 1 and 2. In the example embodiment, the processing resource 302 is operably coupled to the machine readable medium 304. The processing resource 302 may be a physical processor. In some examples, the physical processor may be a microprocessor suitable for performing the functionality described in relation to FIGS. 1 and 2. In some examples, the machine readable medium 304 is non-transitory and is alternatively referred to as a non-transitory machine readable medium.

The processing resource 302 executes one or more program instructions to perform one or more functions described in FIGS. 1 and 2. For example, the processing resource 302 may execute program instructions to determine an initialization status of an auxiliary device from a data corresponding to the auxiliary device, when a computing system is transitioning to a power-on state from a standby-power state. In one or more examples, the initialization status comprises the auxiliary device in an initialized stage or a non-initialized stage.

In some examples, determining the initialization status may include a) accessing a non-volatile memory of the auxiliary device to obtain the data that represents a time period required by the auxiliary device for transitioning to the power-on state and b) ascertaining the initialization status of the auxiliary device by processing the data obtained from the auxiliary device. In some other examples, determining the initialization status may include a) querying the auxiliary device to obtain the data that represents an initialization counter of the auxiliary device, b) ascertaining the initialization status of the auxiliary device by processing the data obtained from the auxiliary device, and c) in response to ascertaining the auxiliary device is in the non-initialized stage, periodically i) re-querying the auxiliary device and ii) re-ascertaining the initialization status of the auxiliary device, until an end of a pre-determined time period. In some other examples, the data may include a first data that represents the time period required by the auxiliary device for transitioning to the power-on state and a second data that represents the initialization counter of the auxiliary device. In such examples, determining the initialization status may include a) accessing a non-volatile memory of the auxiliary device to obtain the first data, b) ascertaining the initialization status of the auxiliary device by processing the first data, and c) in response to ascertaining the auxiliary device is in the non-initialized stage, periodically i) querying the auxiliary device to obtain the second data and ii) ascertaining the initialization status of the auxiliary device by processing the second data obtained from the auxiliary device, until an end of the time period represented in the first data.

The processing resource 302 may later execute the one or more program instructions to perform one or more functions described in FIGS. 1 and 2. For example, the processing resource 302 may execute program instructions to direct an initialization controller for delaying the transitioning of the computing system to the power-on state in response to determining the initialization status of the auxiliary device is in the non-initialized stage. In such examples, the initialization controller may maintain a power supply to at least one of a processor or a chipset of the computing system in a suspended mode. Alternatively, the initialization controller may i) re-initiate the power supply to at least one of a processor or a chipset of the computing system and ii) maintain the at least one of the processor or the chipset in a reset mode.

In some other examples, if the processing resource 302 determines that the initialization status of the auxiliary device is in the initialized stage, then the processing resource 302 may execute the program instructions to direct the initialization controller to transition the computing system to power-on state. For example, the initialization controller may i) re-initiate the power supply to at least one of the processor or the chipset and ii) release the at least one of the processor or the chipset from the reset mode for transitioning the computing system to the power-on state.

Figure 4:
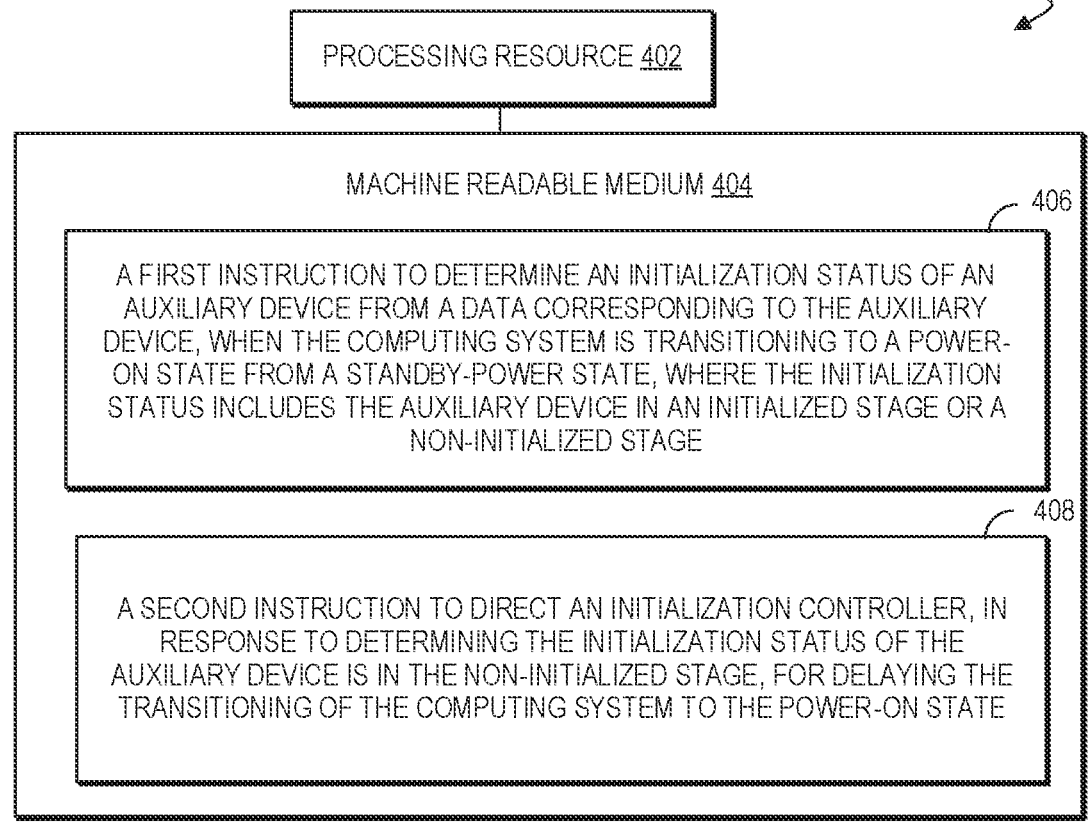
FIG. 4 is a block diagram depicting a processing resource and a machine readable medium encoded with example instructions executable by a manageability controller to manage transitioning of a computing system from a standby-power state to a power-on state, in accordance with embodiments of the present disclosure.
Figure 5:
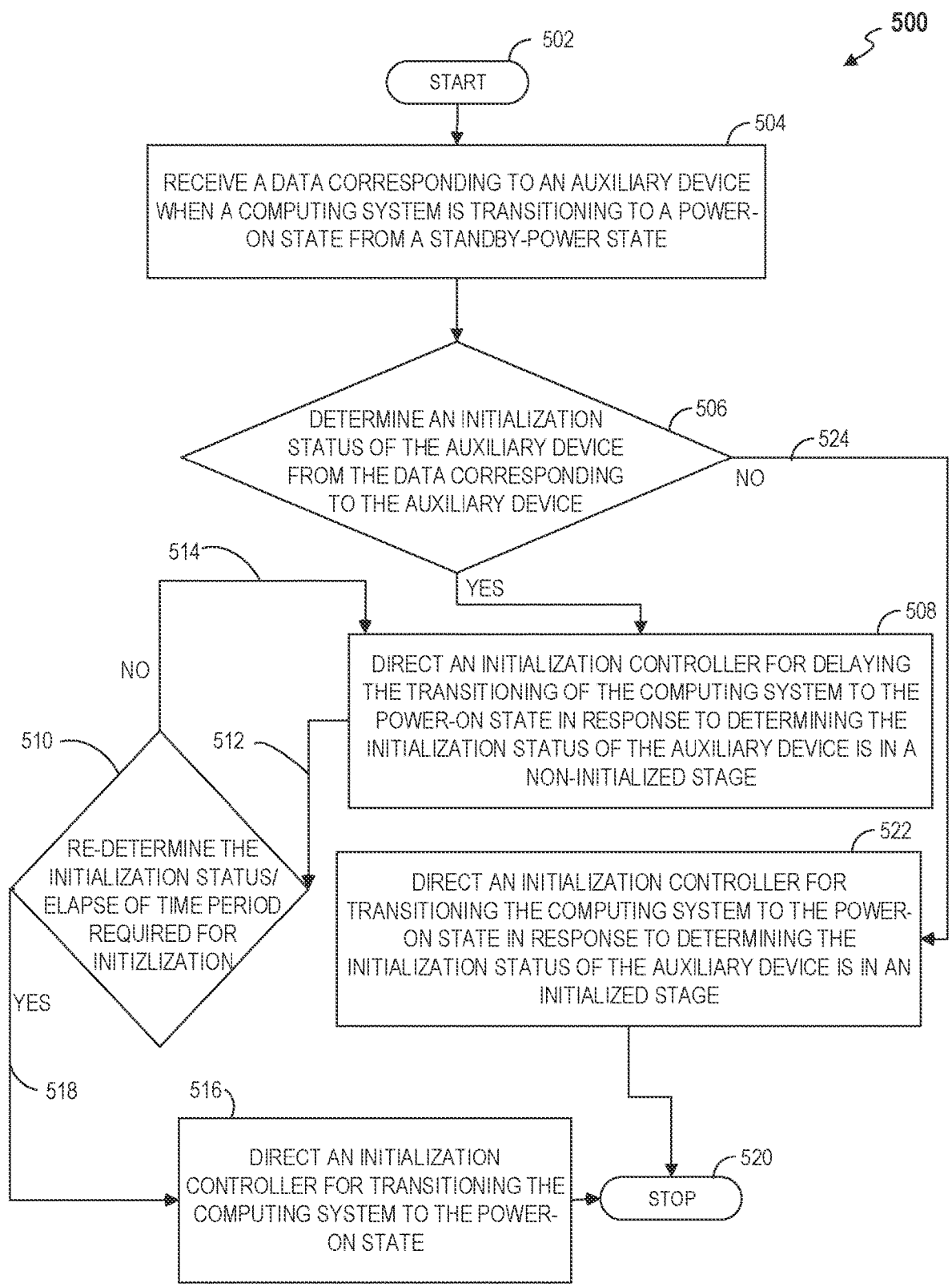
FIG. 5 is a flow diagram depicting a method of transitioning a computing system to a power-on state from a standby-power state, in accordance with embodiments of the present disclosure.

FIG. 4 is a block diagram 400 depicting a processing resource 402 and a machine readable medium 404 encoded with example instructions executable by a manageability controller to manage transitioning of a computing system from a standby-power state to a power-on state. It should be noted herein that the manageability controller referred to in FIG. 4 may be same or similar to manageability controller 108, 308 described in FIGS. 1-2 and 3 respectively. The machine readable medium 404 is non-transitory and is alternatively referred to as a non-transitory machine readable medium. In some examples, the machine readable medium 404 may be accessed by the processing resource 402. In some examples, the machine readable medium 404 stores the program instructions corresponding to functionality of the manageability controller, as discussed in FIGS. 1-2. The machine readable medium 404 may be encoded with example first and second instructions 406 and 408, respectively.

The first instruction 406, when executed by the processing resource 402, may implement aspects of determining an initialization status of an auxiliary device from a data corresponding to the auxiliary device, when a computing system is transitioning to a power-on state from a standby-power state, where the initialization status comprises the auxiliary device in an initialized stage or a non-initialized stage. The step of determining the initialization status of the auxiliary device is described in details in FIGS. 1-2.

The second instruction 408, when executed, may cause the processing resource 402 to direct an initialization controller for delaying the transitioning of the computing system to the power-on state based on determining that the initialization status of the auxiliary device is in the non-initialized stage. Alternatively, the second instructions 408, when executed, may cause the processing resource 402 to direct the initialization controller to transition the computing system to the power-on state based on determining that the initialization status of the auxiliary device is in the initialized stage. The step of directing the initialization controller to delay the transitioning of the computing system to power-on state or transitioning the computing system to the power-on state is described in details in FIGS. 1-2.

FIG. 5 is a flow diagram depicting a method 500 of managing transitioning of a computing system to a power-on state from a standby-power state, in accordance to embodiments of the present disclosure. It should be noted herein that the method 500 is described in conjunction with FIGS. 1-2.

The method 500 starts at block 502 and continues to block 504. At block 504, the method 500 includes receiving a data corresponding to an auxiliary device when a computing system is transitioning to a power-on state from a standby-power state, as described in FIGS. 1-2. In one or more examples, the data may include a first data that represents a time period required by the auxiliary device for transitioning to the power-on state and/or a second data that represents an initialization counter of the auxiliary device. The method 500 continues to block 506.

Referring to one function at block 506, the method 500 includes determining an initialization status of the auxiliary device from the data corresponding to the auxiliary device. In some examples, determining the initialization status may include a) accessing a non-volatile memory of the auxiliary device to obtain the data (i.e., first data) that represents the time period required by the auxiliary device for transitioning to the power-on state and b) ascertaining the initialization status of the auxiliary device by processing the first data obtained from the auxiliary device, as discussed in FIGS. 1-2. In some other examples, determining the initialization status may include a) querying the auxiliary device to obtain the data (i.e., second data) that represents the initialization counter of the auxiliary device and b) ascertaining the initialization status of the auxiliary device by processing the second data obtained from the auxiliary device, as discussed in FIGS. 1-2.

At block 506, if the manageability controller determines that the initialization status of the auxiliary device is in the non-initialized stage i.e., "yes" at block 506, then the method 500 moves to block 508. At block 508, the method 500 includes directing an initialization controller for delaying the transitioning of the computing system to the power-on state, as discussed in FIGS. 1-2. In some examples, delaying the transitioning of the computing system to the power-on state may include maintaining a power supply to at least one of a processor or a chipset of the computing system in a suspended mode. Alternatively, delaying the transitioning of the computing system to the power-on state may include i) re-initiating the power supply to at least one of a processor or a chipset of the computing system and ii) maintaining the at least one of the processor or the chipset in a reset mode. The method 500 continues to block 510, as represented by reference numeral 512.

In some example, at block 510, the method 500 further includes periodically i) re-querying the auxiliary device to obtain the first data and ii) re-ascertaining the initialization status of the auxiliary device based on processing of the first data to determine the initialization status of the auxiliary device. In some other examples, at block 510, the method 500 further includes determining whether the pre-determined time period for initialization of the auxiliary device has been elapsed. In some other examples, at block 510, the method 500 further includes i) querying the auxiliary device to obtain the second data and ii) ascertaining the initialization status of the auxiliary device by processing the second data obtained from the auxiliary device, until an end of the time period represented in the first data. Accordingly, at block 510, A) if the manageability controller determines that the initialization status of the auxiliary device is in the non-initialized stage or B) the pre-determined time period for initialization is not elapsed, or C) the time period represented in the first data for initialization of the auxiliary device is not elapsed, i.e., "no" at block 510 then the method 500 moves to block 508, as represented by reference numeral 514. The method 500 may optionally repeat the function at block 508 and moves back to block 510. At block 510, A) if the manageability controller determines that the initialization status of the auxiliary device is in the initialized stage or B) the pre-determined time period for initialization of the auxiliary device is elapsed, or C) the time period represented in the first data for initialization of the auxiliary device is elapsed, i.e., "yes" at block 510 then the method 500 moves to block 516, as represented by reference numeral 518. In other words, at block 510, if the manageability controller determines that the initialization status of the auxiliary device is in the initialized stage during re-querying and re-ascertaining steps as discussed hereinabove, then the method 500 may move to block 516, as represented by the reference numeral 518. Similarly, in other words, at block 510, if, the manageability controller may determine that the initialization status of the auxiliary device is still in the non-initialized stage after elapsing of the pre-determined time period, or after elapsing of time period represented in the first data, then the method 500 may still move to block 516, as represented by the reference numeral 518.

At block 516, the method 500 includes directing an initialization controller for transitioning the computing system to the power-on state, as described in FIGS. 1-2. In some examples, directing the initialization controller to transitioning the computing system to the power-on state may include maintaining a power supply to at least one of a processor or a chipset of the computing system in a suspended mode. Alternatively, directing the initialization controller to transitioning the computing system to the power-on state may include i) re-initiating the power supply to at least one of a processor or a chipset of the computing system and ii) maintaining the at least one of the processor or the chipset in a reset mode. The method 500 stops at block 520.

Referring back to another function at block 506, if the manageability controller determines that the initialization status of the auxiliary device is in the initialized stage i.e., "no" at block 506, then the method 500 moves to block 522, as represented by reference numeral 524. Accordingly, at block 522, the method 500 includes directing the initialization controller for transitioning the computing system to the power-on state, as described in FIGS. 1-2. In some examples, the directing the initialization controller to transitioning the computing system to the power-on state may include maintaining a power supply to at least one of a processor or a chipset of the computing system in a suspended mode. Alternatively, directing the initialization controller to transitioning the computing system to the power-on state may include i) re-initiating the power supply to at least one of a processor or a chipset of the computing system and ii) maintaining the at least one of the processor or the chipset in a reset mode. The method 500 stops at block 520.

Various features as illustrated in the examples described herein may be implemented to efficiently manage the transitioning of the computing system to a power-on mode from a standby-power mode. The manageability controller and the initialization controller provide a dynamic (or real-time configurable) time period to allow the smart devices, the sufficient time to initialize itself, while maintaining server compatibility with existing industry standard specifications. In other words, manageability controller and the initialization controller retain the processor in a standby-power mode or the reset mode, while allowing other components, such as smart devices or adaptors, to transition from the standby-power mode to the power-on mode, and complete smart adapters initialization, before loading and executing of the BIOS.

In the foregoing description, numerous details are set forth to provide an understanding of the subject matter disclosed herein. However, implementation may be practiced without some or all of these details. Other implementations may include modifications, combinations, and variations from the details discussed above. It is intended that the following claims cover such modifications and variations.

What is claimed is:

1. A method comprising:
   determining, by a manageability controller, an initialization status of an auxiliary device from data corresponding to the auxiliary device, when a computing system is transitioning to a power-on state from a standby-power state,
   wherein the initialization status comprises the auxiliary device in an initialized stage or a non-initialized stage; and
   in response to determining that the initialization status of the auxiliary device is in the non-initialized stage, directing, by the manageability controller, an initialization controller for delaying the transitioning of the computing system to the power-on state.

2. The method of claim 1, wherein determining the initialization status of the auxiliary device comprises:
   accessing a non-volatile memory of the auxiliary device to obtain the data that represents a time period required by the auxiliary device for transitioning to the power-on state; and
   ascertaining the initialization status of the auxiliary device by processing the data obtained from the auxiliary device.

3. The method of claim 1, wherein determining the initialization status of the auxiliary device comprises:
   querying the auxiliary device to obtain the data that represents an initialization counter of the auxiliary device;

ascertaining the initialization status of the auxiliary device by processing the data obtained from the auxiliary device; and in response to ascertaining that the auxiliary device is in the non-initialized stage, periodically i) re-querying the auxiliary device and ii) re-ascertaining the initialization status of the auxiliary device, until an end of a pre-determined time period.

4. The method of claim 1, wherein the data comprises a first data that represents a time period required by the auxiliary device for transitioning to the power-on state and a second data that represents an initialization counter of the auxiliary device, and wherein determining the initialization status of the auxiliary device comprises:

accessing a non-volatile memory of the auxiliary device to obtain the first data;

ascertaining the initialization status of the auxiliary device by processing the first data obtained from the auxiliary device; and in response to ascertaining the auxiliary device is in the non-initialized stage, periodically i) querying the auxiliary device to obtain the second data and ii) ascertaining the initialization status of the auxiliary device by processing the second data obtained from the auxiliary device, until an end of the time period represented in the first data.

5. The method of claim 1, wherein delaying the transitioning of the computing system to the power-on state comprises instructing the initialization controller for maintaining a power supply to at least one of a processor or a chipset of the computing system in a suspended mode.

6. The method of claim 1, wherein delaying the transitioning of the computing system to the power-on state comprises instructing the initialization controller for i) re-initiating a power supply to at least one of a processor or a chipset of the computing system and ii) maintaining the at least one of the processor or the chipset in a reset mode.

7. The method of claim 1, further comprising, in response to determining the initialization status of the auxiliary device is in the initialized stage, instructing, by the manageability controller, the initialization controller for transitioning the computing system to the power-on state.

8. The method of claim 7, wherein transitioning the computing system to the power-on state comprises instructing the initialization controller for i) re-initiating a power supply to at least one of a processor or a chipset and ii) releasing the at least one of the processor or the chipset from a reset mode for transitioning the computing system to the power-on state.

9. A manageability controller comprising:

a non-transitory machine readable medium that stores program instructions; and a processing resource operably coupled to the non-transitory machine readable medium, wherein the processing resource executes the program instructions to:

determine an initialization status of an auxiliary device from a data corresponding to the auxiliary device, when a computing system is transitioning to a power-on state from a standby-power state, wherein the initialization status comprises the auxiliary device in an initialized stage or a non-initialized stage; and in response to determining the initialization status of the auxiliary device is in the non-initialized stage, direct an initialization controller for delaying the transitioning of the computing system to the power-on state.

10. The manageability controller of claim 9, wherein determining the initialization status of the auxiliary device by the processing resource comprises executing the program instructions to:

access a non-volatile memory of the auxiliary device to obtain the data that represents a time period required by the auxiliary device for transitioning to the power-on state; and ascertain the initialization status of the auxiliary device by processing the data obtained from the auxiliary device.

11. The manageability controller of claim 9, wherein determining the initialization status of the auxiliary device by the processing resource comprises executing the program instructions to:

query the auxiliary device to obtain the data that represents an initialization counter of the auxiliary device;

ascertain the initialization status of the auxiliary device by processing the data obtained from the auxiliary device; and in response to ascertaining the auxiliary device is in the non-initialized stage, periodically i) re-query the auxiliary device and ii) re-ascertain the initialization status of the auxiliary device, until an end of a pre-determined time period.

12. The manageability controller of claim 9, wherein the data comprises a first data that represents a time period required by the auxiliary device for transitioning to the power-on state and a second data that represents an initialization counter of the auxiliary device, and wherein determining the initialization status of the auxiliary device by the processing resource comprises executing the program instructions to:

access a non-volatile memory of the auxiliary device to obtain the first data;

ascertain the initialization status of the auxiliary device by processing the first data obtained from the auxiliary device; and in response to ascertaining the auxiliary device is in the non-initialized stage, periodically i) query the auxiliary device to obtain the second data and ii) ascertain the initialization status of the auxiliary device by processing the second data from the auxiliary device, until an end of the time period represented in the first data.

13. The manageability controller of claim 9, wherein delaying the transitioning of the computing system to the power-on state by the processing resource comprises executing the program instructions to direct the initialization controller to maintain a power supply to at least one of a processor or a chipset of the computing system in a suspended mode.

14. The manageability controller of claim 9, wherein delaying the transitioning of the computing system to the power-on state by the processing resource comprises executing the program instructions to direct the initialization controller to i) re-initiate a power supply to at least one of a processor or a chipset of the computing system and ii) maintain the at least one of the processor or the chipset in a reset mode.

15. The manageability controller of claim 9, further comprising, in response to determining the initialization status of the auxiliary device is in the initialized stage, the processing resource executes the program instructions to direct the initialization controller for transitioning the computing system to the power-on state.

16. The manageability controller of claim 15, wherein transitioning the computing system to the power-on state by the processing resource comprises executing the program instructions to instruct the initialization controller to i) re-initiate a power supply to at least one of a processor or a chipset and ii) release the at least one of the processor or the chipset from a reset mode for transitioning the computing system to the power-on state.

17. The manageability controller of claim 9, wherein the standby-power state comprises one of a sleep state or a hibernate state.

18. A non-transitory machine readable medium that stores instructions executable by a manageability controller of a computing system, where the computing system further comprises a processor separate from the manageability controller, wherein instructions comprising:

a first instruction to determine an initialization status of an auxiliary device from a data corresponding to the auxiliary device, when the computing system is transitioning to a power-on state from a standby-power state, wherein the initialization status comprises the auxiliary device in an initialized stage or a non-initialized stage, wherein the standby-power state is a power saving mode of the computing system, wherein the power-on state is an active power supply mode of the computing system, and wherein the auxiliary device is a smart device that is configured to get initialized before transitioning the computing system to the power-on state in order to enable the smart device to perform one or more transactions with the computing system and/or its intended functions; and a second instruction to direct an initialization controller, in response to determining the initialization status of the auxiliary device is in the non-initialized stage, for delaying the transitioning of the computing system to the power-on state.

19. The non-transitory machine readable medium of claim 18, wherein delaying the transitioning of the computing system to the power-on state comprises executing the second instruction to direct the initialization controller for maintaining a power supply to at least one of a processor or a chipset of the computing system in a suspended mode.

20. The non-transitory machine readable medium of claim 18, wherein delaying the transitioning of the computing system to the power-on state comprises executing the second instruction to direct the initialization controller for i) re-initiating a power supply to at least one of a processor or a chipset of the computing system and ii) maintaining the at least one of the processor or the chipset in a reset mode.

* * * * *